United States Patent Office 3,642,837
Patented Feb. 15, 1972

3,642,837
ANTHRAQUINONE COMPOUNDS
Colin William Greenhalgh and David Francis Newton, Manchester, England, assignors to Imperial Chemical Industries Limited, London, England
No Drawing. Filed Mar. 6, 1969, Ser. No. 805,027
Claims priority, application Great Britain, Feb. 27, 1968, 14,270/68
Int. Cl. C09b 1/22, 1/32, 1/50
U.S. Cl. 260—381                                    4 Claims

ABSTRACT OF THE DISCLOSURE

Anthraquinone compounds which contain one or two chloromethyl or bromomethyl groups each of which is in ortho position to an amino group which is attached to an α-position of the anthraquinone nucleus which may contain additional substituents, the preparation of the said compounds from the corresponding hydroxymethyl derivatives, and the use of the said compounds as intermediates in the manufacture of dyestuffs.

This invention relates to anthraquinone compounds and more particularly to anthraquinone compounds containing halogenated methyl groups which are valuable as dyestuff intermediates.

According to the invention there are provided anthraquinone compounds which contain one or two chloromethyl or bromomethyl groups each of which is in ortho position to an amino group which is attached to an α-position of the anthraquinone nucleus which may optionally contain further substituents.

The compounds of the invention can be represented by the formula:

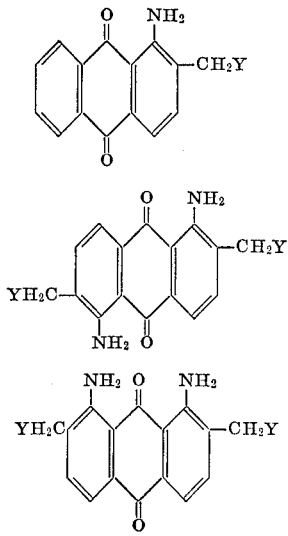

wherein Y is chlorine or bromine, and the anthraquinone nucleus can contain further substituents.

As examples of further substituents which may be present in the anthraquinone nucleus there may be mentioned hydroxy, amino, alkylamino in particular lower alkylamino such as methylamino, ethylamino and butylamino, acylamino, arylamino in particular anilino and substituted derivatives thereof such as anisidino, toluidino, chloroanilino, bromanilino, dimethylanilino and trimethylanilino, nitro, cyano, chlorine, bromine, lower alkyl such as methyl, lower alkoxy such as methoxy, sulphonic acid, sulphonamido and substituted sulphonamido, mercapto, lower alkyl mercapto such as methylmercapto, phenylmercapto, phenylureido, hydroxyphenyl and methoxyphenyl.

Throughout this specification the terms lower alkyl and lower alkoxy are used to denote alkyl and alkoxy groups containing from one to four carbon atoms.

The acylamino groups which may be present as further substituents on the anthraquinone nucleus are preferably acylamino groups of the formula R.CONH— or RSO$_2$NH— wherein R is an optionally substituted hydrocarbon radical, in particular an optionally substituted lower alkyl or phenyl radical. As examples of the acylamino groups there may be mentioned formylamino, acetylamino, propionylamino, benzoylamino, toluylamino, anisoylamino, nitrobenzoylamino, chlorobenzoylamino and methanesulphonylamino.

According to a further feature of the invention there is provided a process for the manufacture of the anthraquinone compounds of the invention which comprises treating with a chlorinating or brominating agent an anthraquinone compound which contains one or two hydroxymethyl groups each of which is in ortho position to an amino group which is attached to an α-position of the anthraquinone nucleus which may optionally contain further substituents.

As examples of the said chlornating or brominating agents there may be mentioned thionyl chloride, thionyl bromide, hydrogen chloride and hydrogen bromide.

The process of the invention can be conveniently carried out by stirring the hydroxymethyl compound and the chlorinating and brominating agent together in the presence of an inert organic liquid, preferably at a temperature between 15° C. and the boiling point of the inert organic liquid. The resulting chloromethyl or bromomethyl compound can then be isolated by conventional methods, for example by adding a liquid which precipitates the said compound from the solution in the inert organic liquid.

The said hydroxymethyl compounds can themselves be obtained by reacting the corresponding anthraquinone compound containing one or two sulphonic acid groups each of which is in ortho position to an α-amino or α-alkylamino group with formaldehyde and with a reducing agent in an alkaline medium, as is described and claimed in U.S. application Ser. No. 650,261.

As specific examples of the said hydroxymethyl compounds which can be used in the process of the invention there can be mentioned 1-amino-2-hydroxymethylanthraquinone,
1-amino-2-hydroxymethyl-4-(chloro-, bromo-, hydroxy-, or cyano-)anthraquinone,
1-amino-2-hydroxymethyl-4-anilinoanthraquinone,
1-amino-2-hydroxymethyl-4-(p-carboxyanilino)anthraquinone,
1-amino-2-hydroxymethyl-4-[p(β-hydroxyethoxy)anilino]anthraquinone,
1-amino-2-hydroxymethyl-4-(p-toluenesulphonamido)anthraquinone,
1-amino-2-hydroxymethyl-4-(phenylureido- or phenylmercapto)-anthraquinone,
1-amino-2-hydroxymethyl-3:4-dihydroxyanthraquinone,
1-amino-2-hydroxymethyl-4-bromo-5-(or 8)-(sulpho-, chloro-, amino or nitro-)anthraquinone,
1:8-diamino-2:7-di(hydroxymethyl)-4:5-dibromoanthraquinone and
1:5-diamino-2:6-di(hydroxymethyl)-4:8-dibromoanthraquinone.

A preferred class of the anthraquinone compounds of the invention comprises the anthraquinone compounds of the formula:

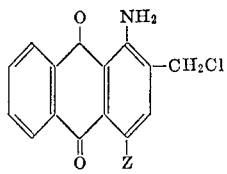

wherein Z is hydrogen or a substituent, in particular bromine, hydroxy, anilino or anilino containing at least one substituent such as lower alkoxy, lower alkyl or chlorine.

The anthraquinone compounds of the invention are valuable as intermediates in the preparation of anthraquinone dyestuffs by conventional methods as will be understood in the art. Thus, for example, by treating the said compounds which are free from sulphonic acid groups with tertiary amines whereby the chloromethyl or bromomethyl group(s) react with the tertiary amine to form a quaternary ammonium compound, Basic Dyestuffs are obtained which are valuable for colouring polyacrylonitrile textile materials by the techniques which are conventionally used for applying Basic Dyestuffs to such textile materials.

The invention is illustrated but not limited by the following examples in which the parts and percentages are by weight:

EXAMPLE 1

A mixture of 2.53 parts of 1-amino-2-hydroxymethylanthraquinone, 2.4 parts of thionyl chloride and 30 parts of toluene is stirred at the boil under a reflux condenser for 15 minutes. The mixture is then cooled to 20° C. and the precipitated 1-amino-2-chloromethylanthraquinone is filtered off, washed with toluene and dried. The yield is 2.6 parts (96%). On analysis the product is found to contain 12.5% of chlorine, the calculated figure for which is 13.0%.

EXAMPLE 2

A mixture of 1 part of 1-amino-2-hydroxymethyl-4-bromoanthraquinone, 10 parts of β-ethoxyethanol and 2 parts of a concentrated aqueous solution of hydrochloric acid is stirred for 18 hours at 95° to 100° C. The mixture is then poured into water and the precipitated solid is filtered off, washed with water and dried. The yield of 1-amino-2-chloromethyl-4-bromoanthraquinone is 0.86 part (82%).

EXAMPLE 3

A mixture of 1.65 parts of 1-amino-2-hydroxymethyl-4-anilinoanthraquinone, 1.2 parts of thionyl chloride and 20 parts of dioxan is stirred for 1 hour at 20° C. to 25° C. The mixture is then poured into 100 parts of water and the precipitated 1-amino-2-chloromethyl-4-anilinoanthraquinone is filtered off, washed with water and dried. The yield is 1.7 parts (98%).

EXAMPLE 4

A mixture of 2 parts of 1-amino-2-hydroxymethyl-4-benzthiazol-2'-ylthioanthraquinone, 30 parts of dioxan and 1.2 parts of thionyl chloride is stirred for 1 hour at 20° to 25° C., and then for 1 hour at 50° C. The mixture is then poured onto water and the precipitated 1-amino-2-chloromethyl-4-benzthiazol-2'-ylthioanthraquinone is filtered off, washed with water and dried. The yield is 1.9 parts (90%).

The hydroxymethyl compound used in this example was itself obtained by condensing 1-amino-2-hydroxymethyl-4-bromo-anthraquinone with 2-mercaptobenzthiazole in butanol at 90° C. in the presence of potassium acetate and copper bronze.

EXAMPLE 5

A mixture of 1 part of 1-amino-2-hydroxymethyl anthraquinone, 50 parts of β-ethoxyethanol and 3 parts of a concentrated aqueous solution of hydrobromic acid is stirred for 2 hours at 20° C. The mixture is then poured into water and the precipitated 1-amino-2-bromomethylanthraquinone is filtered off, washed with water and dried.

EXAMPLE 6

In place of the 1.2 parts of thionyl chloride used in Example 3 there are used 2.1 parts of thionyl bromide whereby 1-amino-2-bromomethyl-4-anilinoanthraquinone is obtained.

EXAMPLE 7

In place of the hydroxymethyl compounds used in each of Examples 1 to 4 there are used equivalent amounts of the following hydroxymethyl compounds whereby the corresponding chloromethyl compounds are obtained:

1-amino-2-hydroxymethyl-4-(2':4'-dimethylanilino) anthraquinone,
1-amino-2-hydroxymethyl-4-(4'-methylanilino) anthraquinone,
1-amino-2-hydroxymethyl-4-(4'-methoxyanilino) anthraquinone,
1-amino-2-hydroxymethyl-4-(2'-chloroanilino) anthraquinone,
1-amino-2-hydroxymethyl-4-(2':4':6'-trimethylanilino) anthraquinone,
1-amino-2-hydroxymethyl-4-(2'-methylanilino) anthraquinone,
1-amino-2-hydroxymethyl-5-chloroanthraquinone,
1-amino-2-hydroxymethyl-4-acetylaminoanthraquinone,
1-amino-2-hydroxymethyl-4-hydroxyanthraquinone.

What we claim is:

1. An anthraquinone compounds of the formula

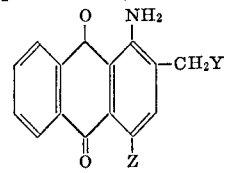

wherein Y is chlorine or bromine, and Z is selected from the group consisting of hydrogen, hydroxy, amino, lower alkylamino, formylamino, acetylamino, propionylamino, benzoylamino, toluylamino, nitrobenzoylamino, chlorobenzoylamino, methanesulphonylamino, anilino, anilino containing lower alkoxy, lower alkyl, bromine or chlorine substitution, nitro, cyano, chlorine, bromine, lower alkyl, lower alkoxy, sulphonamido, toluene sulphonamido, mercapto, lower alkyl mercapto, phenylmercapto, phenylureido, hydroxyphenyl and methoxyphenyl.

2. An anthraquinone compound according to claim 1 wherein Z is hydrogen, bromine, acetylamino, hydroxy, anilino and anilino containing a lower alkoxy, lower alkyl or chlorine substituent.

3. An anthraquinone compound according to claim 1 of the formula

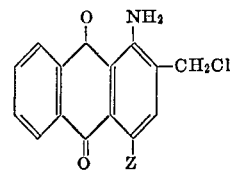

wherein Z is selected from the group consisting of hydrogen, bromine, hydroxy, anilino and anilino containing a lower alkoxy, lower alkyl or chlorine substituent.

4. An anthraquinone compound according to claim 3 wherein Z is hydrogen.

References Cited

Bhavsar et al., C.A. 52, 5358, 1958.

LORRAINE A. WEINBERGER, Primary Examiner

R. GERSTL, Assistant Examiner

U.S. Cl. X.R.

8—39, 40; 260—303, 371, 377, 380